US012786755B2

(12) United States Patent
You

(10) Patent No.: US 12,786,755 B2
(45) Date of Patent: Nov. 3, 2026

(54) WIRELESS COMMUNICATION METHOD, WIRELESS COMMUNICATION APPARATUS, TERMINAL DEVICE AND COMMUNICATION DEVICE

(71) Applicant: GUANGDONG OPPO MOBILE TELECOMMUNICATIONS CORP., LTD., Dongguan (CN)

(72) Inventor: Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 253 days.

(21) Appl. No.: 18/398,994

(22) Filed: Dec. 28, 2023

(65) Prior Publication Data

US 2024/0251261 A1 Jul. 25, 2024

Related U.S. Application Data

(63) Continuation of application No. PCT/CN2021/118581, filed on Sep. 15, 2021.

(51) Int. Cl.

| | |
|---|---|
| ***H04W 24/04*** | (2009.01) |
| ***H04B 7/024*** | (2017.01) |
| ***H04B 7/06*** | (2006.01) |
| ***H04L 5/00*** | (2006.01) |
| ***H04W 72/231*** | (2023.01) |

(52) U.S. Cl.

CPC ............ *H04W 24/04* (2013.01); *H04B 7/024* (2013.01); *H04B 7/06964* (2023.05); *H04L 5/0035* (2013.01); *H04W 72/231* (2023.01)

(58) Field of Classification Search

CPC .... H04B 7/022; H04B 7/024; H04B 7/06964; H04L 5/0035; H04W 24/04; H04W 74/0833; H04W 76/18; H04W 72/231

See application file for complete search history.

(56) References Cited

U.S. PATENT DOCUMENTS

| | | | | |
|---|---|---|---|---|
| 11,943,642 | B2 * | 3/2024 | Jung | H04W 72/542 |
| 2019/0037604 | A1 * | 1/2019 | Akkarakaran | H04L 5/0094 |
| 2019/0297537 | A1 * | 9/2019 | Tsai | H04W 36/0077 |
| 2022/0337363 | A1 * | 10/2022 | Guo | H04W 24/02 |

(Continued)

FOREIGN PATENT DOCUMENTS

| | | | |
|---|---|---|---|
| CN | 112312423 | A | 2/2021 |
| CN | 113271604 | A | 8/2021 |
| WO | 2021155797 | A1 | 8/2021 |

OTHER PUBLICATIONS

International Search Report in the international application No. PCT/CN2021/118581, mailed on Jun. 2, 2022. 5 pages with English translation.

(Continued)

*Primary Examiner* — Eron J Sorrell
(74) *Attorney, Agent, or Firm* — BAYES PLLC

(57) ABSTRACT

Disclosed are a wireless communication method, a wireless communication apparatus, a terminal device and a network device. The method includes: in response to determining that a beam failure occurs for at least two transmission receive points (TRP) in a serving cell, a terminal device transmits first information to a network device, the first information indicating that the beam failure occurs for the at least two TRPs.

20 Claims, 4 Drawing Sheets

(56) References Cited

U.S. PATENT DOCUMENTS

| | | | | |
|---|---|---|---|---|
| 2023/0199529 A1* | 6/2023 | Koskela | H04L 5/0091 370/216 |
| 2024/0276251 A1* | 8/2024 | Zheng | H04W 24/04 |
| 2024/0372673 A1* | 11/2024 | Kwak | H04L 5/0051 |
| 2024/0380471 A1* | 11/2024 | Wu | H04W 36/362 |

OTHER PUBLICATIONS

Written Opinion of the International Search Authority in the international application No. PCT/CN2021/118581, mailed on Jun. 2, 2022. 8 pages with English translation.

3GPP TSG-RAN WG2 Meeting #115 electronic R2-2107995, Online, Aug. 16-Aug. 27, 2021, Agenda item: 8.17.3, Source: Qualcomm Incorporated, Title: Discussion on multi-TRP BFR and new MIMO MAC CE, WID/SID: NR_feMIMO-Core—Release 17, Document for: Discussion and Decision. Chapter 2. 5 pages.

3GPP TSG-RAN WG2 Meeting #115 electronic R2-2xxxxxx, Online, Aug. 2021, Source: RAN2 Chairman (MediaTek), Title: Skeleton Notes. pp. 131-133. 157 pages.

3GPP TSG RAN Meeting #89e RP-202024, Electronic Meeting, Sep. 14-18, 2020, Source: Samsung, Title: Revised WID: Further enhancements on MIMO for NR, Document for: Approval, Agenda Item: 9.8.1. the whole document. 5 pages.

Mediatek Inc: "Enhancement on beam management for multi-TRP", 3GPP Draft; R1-2105367, 3rd Generation Partnership Project (3GPP), Mobilecompetence Centre ; 650, Route Des Lucioles F-06921 Sophia-Antipolis Cedex; France vol. RAN WG1, No. e-Meeting; May 10, 2021May 27, 2021, May 12, 2021 (May 12, 2021), XP052011394, pp. 1-7.

Supplementary European Search Report in the European application No. 21957052.0, mailed on Jul. 4, 2024, 8 pages.

First Office Action of the European application No. 21957052.0, issued on Apr. 4, 2025. 5 pages.

Second Office Action of the European application No. 21957052.0, issued on Oct. 16, 2025.

Ericsson: "PUSCH selection and MsgA payloads in 2-step RA", 3GPP Draft; R2-1912682—PUSCH Selection and MSGA Payloads in 2-STEP RA, 3rd Generation Partnership Project (3GPP), Mobile Competence Centre ; 650, Route Des Lucioles ; F-06921 Sophia-Antipolis Cedex, vol. RAN WG2, No. Chongqing, China; Oct. 14, 2019-Oct. 18, 2019 Oct. 3, 2019 (Oct. 3, 2019).

Oral Proceedings of the European application No. 21957052.0, issued on May 15, 2026.

First Office Action of the Chinese application No. 202180098828.3, issued on Jun. 16, 2026.

* cited by examiner

| | | | | | | | |
|---|---|---|---|---|---|---|---|
| $C_7$ | $C_6$ | $C_5$ | $C_4$ | $C_3$ | $C_2$ | $C_1$ | SP |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bits | | | | | |
| ... | | | | | | | |
| AC | R | Candidate RS ID or R bits | | | | | |
FIG. 3
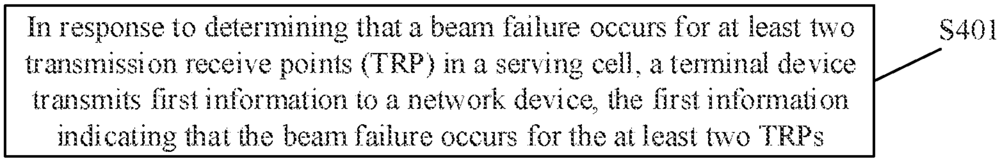
FIG. 4
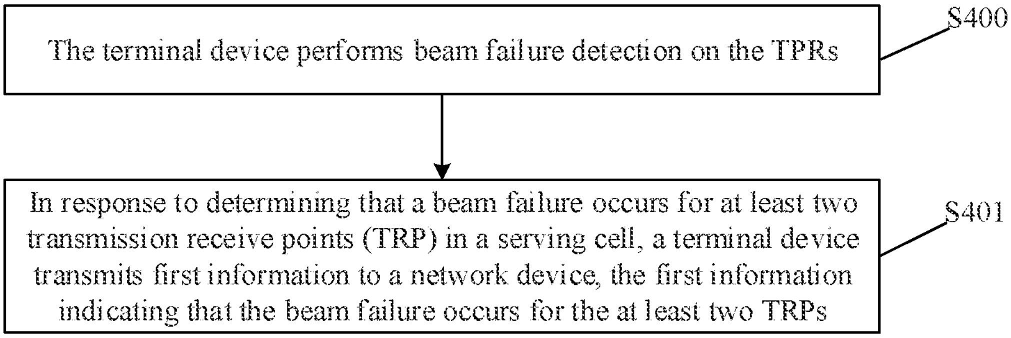
FIG. 5

WIRELESS COMMUNICATION METHOD, WIRELESS COMMUNICATION APPARATUS, TERMINAL DEVICE AND COMMUNICATION DEVICE

CROSS REFERENCE TO RELATED APPLICATIONS

This is a continuation of International Application No. PCT/CN2021/118581, filed on Sep. 15, 2021, and entitled "WIRELESS COMMUNICATION METHOD, WIRELESS COMMUNICATION APPARATUS, TERMINAL DEVICE AND COMMUNICATION DEVICE", the contents of which is incorporated herein by reference in its entirety.

TECHNICAL FIELD

Embodiments of the disclosure relate to the technical field of mobile communication, and particularly to a wireless communication method, a wireless communication apparatus, a terminal device and a communication device.

BACKGROUND

In release 15 (Rel-15) of New Radio (NR), a beam failure recovery (BFR) mechanism is standardized for a Primary Cell (PCell) or a Primary Secondary Cell (PSCell). R16 introduces a BFR for a Secondary Cell (Scell).

In order to expand coverage, multiple transmission receive points (TRP) may be included in one cell. The multiple TRPs share cell information. A terminal device may access the cell through the TRPs. When beam failure detection has been performed on all TRPs of the primary cell, a network device cannot know that the beam failure detection has been performed on all TRPs of the primary cell.

BRIEF DESCRIPTION OF THE DRAWINGS

The accompany drawings constituting a part of the present disclosure provide further understanding of the present disclosure. The schematic embodiments of the present disclosure and description thereof are intended to be illustrative of the present disclosure and do not constitute an undue limitation of the present disclosure. In the accompanying drawings:

FIG. 3 is a schematic diagram of an optional frame structure of a BFR MAC CE according to an embodiment of the present disclosure.

FIG. 4 is an optional schematic flowchart of a wireless communication method according to an embodiment of the present disclosure.

FIG. 5 is an optional schematic flowchart of a wireless communication method according to an embodiment of the present disclosure.

DETAILED DESCRIPTION

The technical schemes in the embodiments of the present disclosure will be described in combination with the drawings in the embodiments of the present disclosure. It is apparent that the described embodiments are partial embodiments of the present disclosure but not all embodiments. Based on the embodiments in the present disclosure, all other embodiments obtained by those of ordinary skill in the art without creative work shall fall within the protection scope of the present disclosure.

Figure 1:
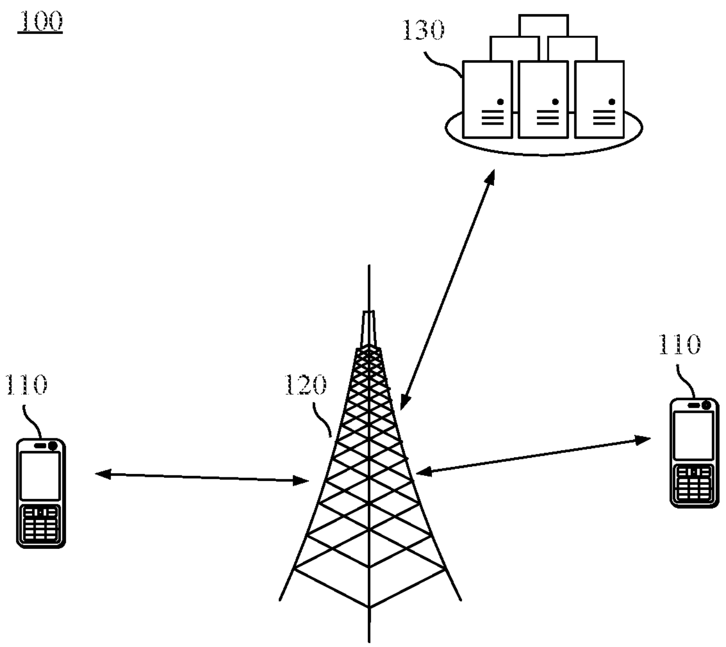
FIG. 1 is an optional schematic diagram of an application scenario to which an embodiment of the present disclosure is applied.

FIG. 1 shows a schematic diagram of an application scenario to which an embodiment of the present disclosure is applied.

As shown in FIG. 1, the communication system 100 includes a terminal device 110 and a network device 120. The network device 120 may communicate with the terminal device 110 through an air interface. Multi-service transmission between the terminal device 110 and the network device 120 is supported.

It should be understood that the embodiments of the present disclosure are illustrative with the communication system 100 only, but are not limited thereto. That is, the technical schemes of the embodiments of the present disclosure can be applied to various communication systems, such as: a long term evolution (LTE) system, a LTE time division duplex (TDD), a universal mobile telecommunication system (UMTS), an internet of things (IoT) system, a narrow band internet of things (NB-IOT) system, an enhanced machine-type communications (Emtc) system, a 5G communication system (also called a NR communication system), or a future communication system, etc.

In the communication system 100 shown in FIG. 1, the network device 120 may be an access network device that communicates with the terminal device 110. The access network device may provide communication coverage for a specific geographical region and may communicate with a terminal device 110 (e.g., a user equipment (UE)) in the coverage.

The network device 120 may be an evolutional node B (Enb or eNodeB) in a long term evolution (LTE) system, a next generation radio access network (NGRAN) device, a base station (Gnb) in a NR system, or a wireless controller in a cloud radio access network (CRAN). The network device 120 may further be a relay station, an access point, a vehicle-mounted device, a wearable device, a hub, a switch, a bridge, a router, or a network device in a future evolutional public land mobile network (PLMN), etc.

The terminal device 110 may be any terminal device, which includes but is not limited to a terminal device connecting with the network device 120 or other terminal devices in a wired or wireless manner.

For example, the terminal device 110 may refer to an access terminal, a UE, a user unit, a user station, a mobile station, a mobile platform, a remote station, a remote terminal, a mobile device, a user terminal, a terminal, a wireless communication device, a user proxy, or a user apparatus. The access terminal may be a cellular phone, a cordless phone, a session initiation protocol (SIP) phone, a IoT device, a satellite handheld terminal, a wireless local loop (WLL) station, a personal digital assistant (PDA), a handheld device with a wireless communication function, a computing device, another processing device connected to a wireless modem, a vehicle-mounted device, a wearable device, a terminal device in the 5G network, or a terminal device in a future evolutional network, etc.

The terminal device 110 may be configured for Device to Device (D2D) communication.

The wireless communication system 100 may further include a core network device 130 that communicates with a base station. The core network device 130 may be a 5G core (5GC) device, such as an access and mobility management function (AMF), an authentication server function (AUSF), a user plane function (UPF), or a session management function (SMF). In an embodiment, the core network device 130 may further be an evolved packet core (EPC) device in the LTE network, e.g., a session management function+core packet gateway (SMF+PGW-C) device. It should be understood that the SMF+PGW-C can achieve the same functions as the SMF and the PGW-C. During the process of network evolution, the aforementioned core network device may be further called by other names; or a new network entity may be formed by dividing the functions of the core network, which is not limited by the embodiments of the present disclosure.

A connection may be established between various functional units in the communication system 100 through a next generation (NG) interface, to realize communication.

For example, the terminal device establishes an air-interface connection with the access network device through a Uu interface for transmitting user plane data and control plane signaling. The terminal device may establish a control plane signaling connection with the AMF through a NG interface 1 (abbreviated as N1). The access network device, such as a next generation wireless access base station (Gnb), may establish a user plane data connection with the UPF through an NG interface 3 (abbreviated as N3). The access network device may establish the control plane signaling connection with the AMF through an NG interface 2 (abbreviated as N2). The UPF may establish the control plane signaling connection with the SMF through an NG interface 4 (abbreviated as N4). The UPF may interact the user plane data with a data network through an NG interface 6 (abbreviated as N6). The AMF may establish the control plane signaling connection with the SMF through an NG interface 11 (abbreviated as N11). The SMF may establish the control plane signaling connection with the PCF through an NG Interface 7 (abbreviated as N7).

One base station, one core network device and two terminal devices are exemplarily shown in FIG. 1. In an embodiment, the wireless communication system 100 may include multiple base stations, and another number of terminal devices may be included in the coverage of each base station, which is not limited in the embodiments of the present disclosure.

It should be noted that FIG. 1 is only an example of the system to which the present disclosure applies. Of course, the methods shown in the embodiments of the present disclosure may also be applied to other systems. Moreover, the terms "system" and "network" in the present disclosure may be generally used interchangeably herein. In the present disclosure, the term "and/or" only indicates an association relationship for describing associated objects and represents that there are three relationships. For example, A and/or B may represent three conditions: i.e., independent existence of A, existence of both A and B and independent existence of B. In addition, the character "/" in the present disclosure usually represents that previous and next associated objects form an "or" relationship. It should also be understood that, the term "indicate" referred in the embodiments of the present disclosure may be a direct indication, an indirect indication, or an indicative of an association. For example, A indicates B, which may mean that A directly indicates B, e.g., B can be acquired through A. It may further mean that A indirectly indicates B, e.g., A indicates C and B can be acquired by C. It may further indicate that there is an association between A and B. It should also be understood that, the term "corresponding" referred to in the embodiments of the present disclosure may mean that there is a direct correspondence or an indirect correspondence relationship between two objects, may further mean that there is an association relationship between the two objects, may be further a relationship between the indication and the object to be indicated, or, the configuration and the object to be configured, etc. It should also be understood that, the term "predefined" or "predefined rules" referred in the embodiments of the present disclosure may be implemented by pre-storing corresponding codes, tables, or other means that may be used to indicate relevant information in a device (e.g., including a terminal device or a network device). The specific implementations of which are not limited by the present disclosure. For example, the "predefined" can refer to what is in defined in the protocol. It should also be understood that, the term "protocol" in the embodiments of the present disclosure may refer to a standard protocol in the communication field, such as, a LTE protocol, a NR protocol, and related protocols applied in a future communication system, which are not limited herein.

In order to facilitate understanding of the technical schemes of the embodiments of the present disclosure, the related technologies involved in the embodiments of the present disclosure are described. The following related technologies can be arbitrarily combined with the technical schemes of the embodiments of the present disclosure as alternatives, and they are within the scope of protection of the embodiments of the present disclosure.

SpCell BFR

In the NR Rel-15, the BFR is standardized for a Pcell or PSCell; here, the Pcell and PSCell are collectively known as a SpCell. The UE may notify, by means of random access, the base station of the downlink transmission beam that is to be used for transmitting a random access response (RAR), thereby to recover the downlink beam. A random access preamble of an NR random access is configured by a single synchronization signal block (SSB). The UE firstly selects an index of an SSB/channel state information-reference signal (CSI-RS) that meets a threshold by comparing reference signal receiving powers (RSRPs) of the CSI-RSs with the threshold. Then, the UE transmits a message 1 (Msg1) by using a preamble and physical random access channel (PRACH) resource corresponding to the SSB. That is, after receiving the preamble, the Gnb can know which SSB is to be used to feedback the RAR. Here, the SSB and the CSI-RS are linked with each other.

A Beam failure recovery procedure includes the following operations.

1. Beam failure detection (BFD)

By measuring the CSI-RS and/or SSB, a physical layer determines whether quality of a physical downlink control channel (PDCCH) corresponding to the CSI-RS and/or SSB meets a predetermined/configured threshold, i.e., a performance of a hypothetical block error rate (BLER) is lower than the threshold. In response to detecting a beam failure, the physical layer reports a beam failure instance (BFI) to a medium access control (MAC). For a MAC entity, whenever the physical layer reports the BFI, the UE adds 1 to a beam failure instance counter (BFI_COUNTER) and restarts a beam failure detection timer (beamFailureDetectionTimer). In response to the BFI_COUNTER reaching a maximum value during the running of the beamFailureDetectionTimer, it is considered that the beam failure occurs, and a random access procedure is initiated. Here, the SSB may be an abbreviation for a synchronization signal (SS)/physical broadcast channel (PBCH) block.

2. New candidate beam identification

The UE selects a new beam that meets the predetermined/configured threshold. Based on the CSI-RS and/or SS/PBCH block (abbreviated as SSB), 3. If no new beam meeting the condition can be selected, the UE adopts a contention-based random access procedure.
4. Beam failure recovery request transmission: if a new beam meeting the condition is selected, the UE selects a PRACH corresponding to the new beam to initiate transmission, or reports the selected new beam through a physical uplink control channel (PUCCH).
5. The UE detects a response to a beam failure recovery request (BFRQ) from a network.

After receiving the BFRQ from the UE, the network knows that the beam failure occurs for the UE, and transmits the PDCCH on the new beam. When receiving the PDCCH from the network on the new beam, the UE determines that response information from the network has been received correctly. As such, the beam failure recovery procedure is completed successfully.

Scell BFR

R16 introduces a BFR for a Scell (i.e., a Scell BFR), in which the UE reports a BFR MAC Control Element (CE) to indicate that a beam failure occurs for the Scell.

The MAC CE for the BFR includes a BFR MAC CE or Truncated BFR MAC CE.

The BFR MAC CE or Truncated BFR MAC CE is identified by a logical channel identify (LCID)/enhanced LCID (Elcid) in a MAC subheader.

A size of the BFR MAC CE or Truncated BFR MAC CE may be changed. The BFR MAC CE or Truncated BFR MAC CE includes a bitmap and beam detection recovery information in an ascending order of service cell indexes (ServCellIndex). The beam detection recovery information may be eight bytes that contain indication(s) of available candidate beam(s) (AC) for the Scell indicated in the bitmap. For the BFR MAC CE, when it is detected that the beam failure occurs for the Scell of the MAC entity, and an evaluation for candidate beam(s) according to requirements specified in TS 38.133[11] is completed, if the maximum ServCellIndex of the Scell is less than 8, an eight-byte bitmap is used. Otherwise, four eight-byte bitmaps are used. One MAC PDU includes one BFR MAC CE at most.

For the Truncated BFR MAC CE, a single eight-byte bitmap is used in the following conditions. Otherwise, four eight-byte bitmaps are used:

it is detected that the beam failure occurs for the Scell of the MAC entity, the evaluation for the candidate beam according to the requirements specified in TS 38.133 is completed, and the maximum ServCellIndex of the Scell is less than 8.

Or, it is detected that the beam failure occurs for the SpCell of the MAC entity (as described in section 5.17), the SpCell will be indicated in the Truncated BFR MAC CE, and an UL-SCH resource available for transmission cannot accommodate four logical channel prioritization (LCP)-based Truncated BFR MAC Ces and sub-headers.

Figure 2:
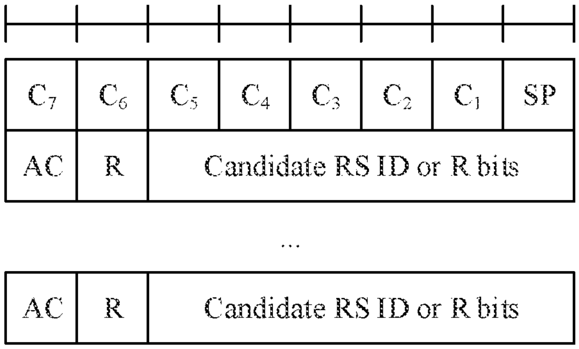
FIG. 2 is a schematic diagram of an optional frame structure of a beam failure recovery (BFR) medium access control (MAC) control element (CE) according to an embodiment of the present disclosure.

As shown in FIG. 2, the BFR MAC CE or Truncated BFR MAC CE indicating an available beam(s) with an eight-byte bitmap, includes the following fields: an SP field, a $C_i$ field, an AC field, and a candidate reference signal identification (Candidate RS ID) field or a reserved I field, where a value of i is less than 8. Here, the SP field indicates an SpCell beam failure detection; the $C_i$ field indicates that the AC field is used for the primary cell of which ServCellIndex is i; and the AC field indicates whether the Candidate RS ID field is included. The Candidate RS ID field is an index of a SSB from SSBs in a candidate beam list of which SS-RSRP is greater than a BFR RSRP threshold, or an index of a CSIS-RS from CSIS-RSs in a candidate beam list whose CSIS-RSRP is greater than the BFR RSRP threshold.

As shown in FIG. 3, the BFR MAC CE or Truncated BFR MAC CE indicating the available beam(s) with the four eight-byte bitmaps, includes the following fields: an SP field, a $C_i$ field, an AC field, candidate reference signal identification, and a reserved field, where a value of i is less than 32.

In order to expand the coverage, one cell may generally include multiple transmission receive points (TRP). The multiple TRPs share cell information, and the UE may access the cell through the TRPs.

On the RAN2 115e meeting, the following conclusions are drawn based on the TRP-BFR.

If all TRPs of a Scell detect the beam failure, a beam failure recovery is triggered for the Scell.

If all TRPs of a SpCell detect the beam failure, a random access procedure is initiated on the SpCell.

Therefore, if the beam failure occurs for a primary cell and a BFR RACH resource dedicated to the TRPs has not been configured, the network side does not know whether a current random access procedure is triggered by a cell beam failure or a TRP beam failure.

In order to facilitate understanding the technical schemes of the embodiments of the present disclosure, the technical schemes of the present disclosure will be described in detail below by way of specific embodiments. As an optional scheme, the aforementioned related technologies may be combined with the technical schemes of the embodiments of the present disclosure at will, and all of them belong to the protection scope of the embodiments of the present disclosure. Embodiments of the present disclosure include at least some of the following.

As shown in FIG. 4, a wireless communication method provided by the embodiments of the present disclosure includes the following operation S401.

At block S401, in response to determining that a beam failure occurs for at least two transmission receive points (TRP) in a serving cell, a terminal device transmits first information to a network device, the first information indicating that the beam failure occurs for the at least two TRPs.

At least two TRPs are included in the serving cell. When the beam failure occurs for all TRPs in the serving cell, the terminal device determines to trigger a beam failure recovery procedure for the TRPs.

The beam failure recovery procedure triggered by the terminal device includes that: the terminal device transmits the first information to the network device, to notify the network device that the beam failure occurs for all TRPs in the serving cell.

In some embodiments, as shown in FIG. 5, before the S401, the terminal device may perform the following operation S400.

At block S400, the terminal device performs beam failure detection on the TPRs.

A physical layer of the terminal device detects a beam corresponding to a PDCCH, and further reports a BFI to an MAC in response to detecting that the beam failure occurs. For a MAC entity, whenever the physical layer reports a BFI, the UE adds 1 to a BFI_COUNTER and restarts a beam failure detection timer (beamFailureDetectionTimer). In response to the BFI_COUNTER reaching the maximum value during the running of the beamFailureDetectionTimer, it is considered that the failure beam occurs.

Figure 6:
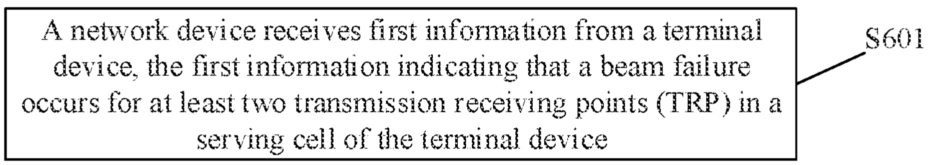
FIG. 6 is an optional schematic flowchart of a wireless communication method according to an embodiment of the present disclosure.

As shown in FIG. 6, a wireless communication method provided by the embodiments of the present disclosure includes the following operation S601.

At block S601, a network device receives first information from a terminal device, the first information indicating that a beam failure occurs for at least two transmission receiving points (TRP) in a serving cell of the terminal device.

In response to determining that the beam failure occurs for all TRPs in the serving cell, the terminal device triggers the beam failure recovery procedure for the TRPs. The process of the terminal device triggering the beam failure recovery procedure for the TRPs includes the following operations. The terminal device transmits the first information to the network device. The network device receives the first information from the terminal device, and determines, based on the first information, that the beam failure occurs for all TRPs in the serving cell of the terminal device.

A wireless communication method provided by the embodiments of the present disclosure includes the following operations S61 and S62.

At block S61, in response to determining that a beam failure occurs for at least two transmission receive points (TRP) in a serving cell, a terminal device transmits first information to a network device.

At block S62, the network device receives the first information from the terminal device.

In the embodiments of the present disclosure, in response to determining that the beam failure occurs for all TRPs in the serving cell of the terminal device, the terminal device notifies, through the first information, the network device that the beam failure occurs for all TRPs in the serving cell. Therefore, the network device can determine a trigger cause of the beam failure occurring for the terminal device, perform beam switching timely, thus improving continuity of user service quality.

In some embodiments, the operation of the terminal device transmitting the first information to the network device includes the following.

The terminal device transmits the first information to the network device through a first message in a random access procedure.

Or, the terminal device transmits the first information to the network device through a second message after the random access procedure succeeds.

Or, the terminal device transmits the first information to the network device through a target beam failure recovery (BFR) medium access control (MAC) control element (CE).

Here, the operation of the network device receiving the first information from the terminal device includes the following.

The network device receives the first information from the terminal device through the first message in the random access procedure.

Or, the network device receives the first information from the terminal device through the second message after the random access procedure succeeds.

Or, the network device receives the first information from the terminal device through the target BFR MAC CE.

In the embodiments of the present disclosure, the first information is transmitted in the following manners.

- Manner 1: the first information is transmitted through the first message in the random access procedure.
- Manner 2: the first information is transmitted through the second message after the random access procedure succeeds.
- Manner 3: the first information is transmitted through the target BFR MAC CE.

For the manner 1, when the terminal device determines that the beam failure occurs for all TRPs in the serving cell, the beam failure recovery procedure for the TRPs triggered by the terminal device includes the random access procedure and the transmission of the first information through the first message in the random access procedure. The network device receives the first information through the first message in the random access procedure.

In an embodiment, the first information is transmitted through the first message implicitly or explicitly.

In an embodiment, the first message is a first message in a four-step random access procedure: a message 1 (Msg1), a third message in the four-step random access procedure: a message 3 (Msg3), or a first message in a two-step random access procedure: a message A (MsgA). The message 1 carries a preamble, the message 3 carries identification of the terminal device, and the message A carries information carried in the messages 1 and 3.

In an embodiment, the random access procedure triggered by the terminal device includes a non-contention-based random access procedure or a contention-based random access procedure.

In an embodiment, in case that the terminal device is configured with a random access resource for the BFR, the random access procedure is the non-contention-based random access procedure. In case that the terminal device is not configured with the random access resource for the BFR, the random access procedure is the contention-based random access procedure.

In an embodiment, the random access resource for the BFR includes at least one of a random access resource for a TRP BFR or a random access resource for a cell BFR.

For the manner 2, in response to the terminal device determining that the beam failure occurs for all TRPs in the serving cell, the process of the terminal device triggering the beam failure recovery procedure for the TRPs includes the random access procedure and the transmission of the second message. The terminal device transmits the second message to the network device after the random access procedure succeeds, and further transmits the first information through the second message. The network device receives the first information through the second message after the random access procedure succeeds.

For the manner 3, in response to the terminal device determining that the beam failure occurs for all TRPs in the serving cell, the process of the terminal device triggering the beam failure recovery procedure for the TRPs includes the transmission of the target BFR MAC CE. The terminal device reports the target BFR MAC CE to the network device, and transmits the first information through the target BFR MAC CE. The network device receives the first information through the target BFR MAC CE reported by the terminal device.

In some embodiments, the first message is a message 1 or message A in the random access procedure, the message 1 or message A is transmitted by using a first resource, the first resource is a random access resource for a TRP BFR, and the first resource indicates the first information.

The terminal device initiates the random access procedure by using the first resource. At the time, the terminal device transmits the message 1 or message A by using the first resource, and implicitly transmits the first information based on the first resource used by the message 1 or message A. That is, the terminal device implicitly indicates, through the message 1 or message A, that the beam failure occurs for all TRPs in the serving cell.

The network device receives the message 1 or message A that is transmitted by using the first resource. Based on the first resource used by the message 1 or message A, the network device determines that the beam failure occurs for all TRPs in the serving cell of the terminal device.

In some embodiments, in case that the terminal device is configured with the random access resource for the TRP BFR, the message 1 or message A is transmitted by using the random access resource for the TRP BFR.

In case that the terminal device is configured with the first resource, the terminal device transmits the message 1 or message A by using the first resource, and the network device receives the message 1 or message A by using the first resource.

In some embodiments, the first message is a message 3 or message A in the random access procedure, the first information is carried in the first message, the message 1 or message A is transmitted by using a second resource or a third resource, the second resource is a random access resource for a cell BFR, and the third resource is a contention-based random access resource.

Here, the first message is the message 3 or message A in the random access procedure, and the message 1 or message A in the random access procedure is transmitted by using the second or third resource. Here, the terminal device transmits the first information through the message 3 or message A explicitly.

In an embodiment, the terminal device initiates the non-contention-based random access procedure by using the second resource. At the time, the terminal device transmits the message 1 or message A by using the second resource, and the network device receives the message 1 or message A by using the second resource.

In an embodiment, the terminal device initiates the contention-based random access procedure by using the third resource. At the time, the terminal device transmits the message 1 or message A by using the third resource, and the network device receives the message 1 or message A by using the third resource.

In some embodiments, in case that the terminal device is not configured with a random access resource for a TRP BFR but is configured with the random access resource for the cell BFR, the message 1 or message A is transmitted by using the random access resource for the cell BFR. Or, in case that the terminal device is not configured with the random access resource for the TRP BFR and is not configured with the random access resource for the cell BFR, the message 1 or message A is transmitted by using the contention-based random access resource.

In some embodiments, in case that the terminal device is not configured with the random access resource for the TRP BFR but is configured with the random access resource for the cell BFR, the terminal device uses the random access resource for the cell BFR for the random access procedure, and further transmits the message 3 or message A. Or, in case that the terminal device is not configured with the random access resource for the TRP BFR and is not configured with the random access resource for the cell BFR, the terminal device triggers the contention-based random access procedure, and further transmits the message 3 or message A.

In the embodiments of the present disclosure, in case that the terminal device is not configured with the first resource, the terminal device initiates the non-contention-based random access procedure by using the second resource. Thus, the terminal device transmits the message 1 or message A by using the second resource, and further transmits the message 3 by using a resource in the message 2 configured by the network device. The network device receives the message 1 or message A by using the second resource, and further receives the message 3 by using the configured resource in the message 2. In case that the terminal device is not configured with the first resource and is not configured with the second resource, the terminal device initiates the contention-based random access procedure by using the third resource. Thus, the terminal device transmits the message 1 or message A by using the third resource, and further transmits the message 3 by using the resource in the message 2 configured by the network device. The network device receives the message 1 or message A by using the third resource, and further receives the message 3 by using the configured resource in the message 2.

In some embodiments, the second message is an uplink message after the random access procedure succeeds, and the first information is carried in the uplink message.

After the random access procedure succeeds, the terminal device transmits the uplink message to the network device, and the first information is carried in the uplink message. After the random access procedure succeeds, the network device receives the uplink message from the terminal device.

In an embodiment, the terminal device transmits the first information through the uplink message explicitly.

In some embodiments, in case that the terminal device is not configured with the random access resource for the TRP BFR and is not configured with the random access resource for the cell BFR, the random access procedure is initiated by using a contention-based random access resource.

In some embodiments, in the case that the first information is transmitted through the message 3/message A, or the first information is transmitted through the uplink message, the first information is a first BFR MAC CE, and the first BFR MAC CE corresponds to the at least two TRPs.

In case that the terminal device transmits the first information through one of the following messages, the first information is the first BFR MAC CE:

- the message 3/message A in the random access procedure; or,
- the uplink message in the random access procedure.

In the embodiments of the present disclosure, in the manner 3, the target BFR MAC CE includes at least one of the following:

- information 1: the second BFR MAC CE, where the second BFR MAC CE is a BFR MAC CE corresponding to a second TRP among the at least two TRPs, and the second BFR MAC CE indicates that the beam failure occurs for the second TRP in the serving cell;

information 2: the third BFR MAC CE, where the third BFR MAC CE is a BFR MAC CE corresponding to the serving cell, and the third BFR MAC CE indicates that the beam failure occurs for the serving cell; or information 3: the first BFR MAC CE, where the first BFR MAC CE is a BFR MAC CE corresponding to the at least two TRPs in the serving cell, and the first BFR MAC CE indicates that the beam failure occurs for all TRPs in the serving cell.

In some embodiments, the target BFR MAC CE includes the second BFR MAC CE. In case that the terminal device has transmitted a BFR MAC CE corresponding to a first TRP and has not received a correct reception feedback for the BFR MAC CE corresponding to the first TRP, the terminal device transmits the second BFR MAC CE. The second BFR MAC CE is the BFR MAC CE corresponding to the second TRP, and the first TRP and the second TRP are different TRPs among the at least two TRPs.

The correct reception feedback for the BFR MAC CE corresponding to the first TRP is feedback information from the network device, and the feedback information indicates to the terminal device that the BFR MAC CE corresponding to the first TRP has been received correctly.

In some embodiments, the target BFR MAC CE includes a second BFR MAC CE. In case that the network device has received the BFR MAC CE corresponding to the first TRP and has not transmitted the correct reception feedback for the BFR MAC CE corresponding to the first TRP, the network device receives the second BFR MAC CE. The second BFR MAC CE is the BFR MAC CE corresponding to the second TRP, and the first TRP and the second TRP are different TRPs among the at least two TRPs.

In case that the terminal device has transmitted the BFR MAC CE corresponding to the first TRP and has received the correct reception feedback for the BFR MAC CE corresponding to the first TRP, the beam failure recovery for the first TRP is completed. In case that the terminal device has transmitted the BFR MAC CE corresponding to the first TRP and has not received the correct reception feedback for the BFR MAC CE corresponding to the first TRP, the beam failure recovery for the first TRP is not completed. Here, the BFR MAC CE corresponding to the first TRP indicates that the beam failure occurs for the first TRP. In an embodiment, the second TRP includes one or more TRPs.

In case that the terminal device has transmitted the BFR MAC CE corresponding to the first TRP but the beam failure recovery for the first TRP is not completed, the terminal device transmits the second BFR MAC CE to the network device, to indicate that the beam failure occurs for the second TRP. In case that the network device has received the BFR MAC CE corresponding to the first TRP, the network device receives the second BFR MAC CE, and determines that the beam failure occurs for all TRPs in the serving cell of the terminal device.

In an example, the serving cell includes two TRPs: a TRP1 and a TRP2. Here, the TRP1 is the first TRP and the TRP2 is the second TRP. In case that the beam failure occurs for the TRP1, the terminal device transmits a BFR MAC CE corresponding to the TRP1 to the network device. In case that the terminal device has not received a correct reception feedback for the BFR MAC CE corresponding to the TRP1, it is detected that the beam failure occurs for the TRP2. At the time, the terminal device determines that the beam failure occurs for all TRPs in the serving cell, and further transmits the BFR MAC CE corresponding to the TRP2 to the network device, to indicate that the beam failure occurs for all TRPs in the serving cell of the terminal device. In case that the network device has received the BFR MAC CE corresponding to the TRP1 and the BFR MAC CE corresponding to the TRP2, the network device determines that the beam failure occurs for all TRPs in the serving cell of the terminal device.

In an example, the serving cell includes three TRPs: a TRP1, a TRP2 and a TRP3. Here, the TRP1 is the first TRP, and the second TRP includes the TRP2 and TRP3. In case that the beam failure occurs for the TRP1, the terminal device transmits a BFR MAC CE corresponding to the TRP1 to the network device. In case that the terminal device has not received a correct reception feedback for the BFR MAC CE corresponding to the TRP1, it is detected that the beam failure occurs for the TRP2 and TRP3. At the time, the terminal device determines that the beam failure occurs for all TRPs in the serving cell, and further transmits the BFR MAC CE corresponding to the TRP2 and TRP3 to the network device, to indicate that the beam failure occurs for all TRPs in the serving cell of the terminal device. In case that the network device has received the BFR MAC CE corresponding to the TRP1 and the BFR MAC CE corresponding to the TRP2 and TRP3, the network device determines that the beam failure occurs for all TRPs in the serving cell of the terminal device.

In an embodiment, the BFR MAC CE corresponding to the TRP2 and TRP3 may be one BFR MAC CE, or may be two independent BFR MAC Ces.

In some embodiments, the second BFR MAC CE includes at least one of the following:

cell identification of the serving cell;

bandwidth part (BWP) identification;

TRP identification of the second TRP;

first indication information, the first indication information indicating whether a first available beam exists, and the first available beam being an available beam for the second TRP; or at least one first available beam.

For the TRP identification of the second TRP, the TRP identification of the second TRP represents the second TRP, or indicates that the beam failure occurs for the second TRP.

In an embodiment, in case that the second TRP corresponding to the second BFR MAC CE includes one TRP, the TRP identification of the second TRP represents the TRP, or indicates that the beam failure occurs for the TRP.

In an embodiment, in case that the second TRP corresponding to the second BFR MAC CE includes multiple TRPs, the TRP identification of the second TRP represents the multiple TRPs, or indicates that the beam failure occurs for the multiple TRPs.

In an example, the second BFR MAC CE is the BFR MAC CE corresponding to the TRP2 and TRP3, and the TRP identifications included in the second BFR MAC CE represent the TRP2 and TRP3, or indicate that the beam failure occurs for the TRP2 and TRP3.

In an embodiment, the TRP identification of the second TRP is a beam failure detection-reference signal (BFD-RS) set ID of the second TRP. At the time, the TRP identification represents the second TRP.

In an embodiment, the TRP identification of the second TRP may be identified by a first identification field, and the first identification field may include one or more bits. The one or more fields in the first identification field may be used to indicate that the beam failure occurs for the second TRP, and the number of bits included in the first identification field may be determined based on the number of TRPs in the serving cell.

In one example, the serving cell includes two TRPs: a TRP1 and a TRP2. The first identification field includes a bit0. Here, the bit0 with a value of 0 indicates that the beam failure occurs for the TRP1, and the bit0 with a value of 1 indicates that the beam failure occurs for the TRP2. When the second BFR MAC CE is the BFR MAC CE corresponding to the TRP2, the value of bit0 is 1.

In one example, the serving cell includes three TRPs: a TRP1, a TRP2 and a TRP3. The first identification field includes a bit0 and bit1. Here, the bit and bit1 with a value of 00 indicate that the beam failure occurs for the TRP1, the bit0 and bit1 with a value of 01 indicate that the beam failure occurs for the TRP2, and the bit0 and bit1 with a value of 10 indicate that the beam failure occurs for the TRP1 and TRP2. When the second BFR MAC CE is the BFR MAC CE corresponding to the TRP2, the value of the first identification field is 01.

In one example, the serving cell includes two TRPs: a TRP1 and a TRP2. The first identification field includes a bit0 and a bit1. Here, the bit0 indicates whether the beam failure occurs for the TRP1, and the bit1 indicates whether the beam failure occurs for the TRP2. The bit0 with a value of 0 indicates that the beam failure does not occur for the TRP1, the bit0 with a value of 1 indicates that the beam failure occurs for the TRP1, the bit with a value of 0 indicates that the beam failure does not occur for the TRP2, and the bit1 with a value of 1 indicates that the beam failure occurs for the TRP2. When the second BFR MAC CE is the BFR MAC CE corresponding to the TRP2, the value of bit1 is 1.

In one example, the serving cell includes three TRPs: a TRP1, a TRP2 and a TRP3. The first identification field includes a bit0, a bit1 and a bit2. Here, the bit0 indicates whether the beam failure occurs for the TRP1, the bit1 indicates whether the beam failure occurs for the TRP2, and the bit2 indicates whether the beam failure occurs for the TRP3. The bit0 with a value of 0 indicates that the beam failure does not occur for the TRP1, the bit0 with a value of 1 indicates that the beam failure occurs for the TRP1, the bit1 with a value of 0 indicates that the beam failure does not occur for the TRP2, the bit1 with a value of 1 indicates that the beam failure occurs for the TRP2, the bit2 with a value of 0 indicates that the beam failure does not occur for the TRP3, and the bit2 with a value of 1 indicates that the beam failure occurs for the TRP3. When the second BFR MAC CE is the BFR MAC CE corresponding to the TRP2, the value of the first identification field is 010. When the second BFR MAC CE is the BFR MAC CE corresponding to the TRP2 and TRP3, the value of the first identification field is 011.

In one example, the serving cell includes two TRPs: a TRP1 and a TRP2. The first identification field includes a bit0 and a bit1. Here, the bit0 indicates, when a beam failure occurs for one TPR, the TRP for which the beam failure occurs, and the bit1 indicates whether there are two TRPs for which the beam failure occurs. The bit0 with a value of 0 indicates that the beam failure occurs for the TRP1 only, the bit0 with a value of 1 indicates that the beam failure occurs for the TRP2 only, and the bit1 with a value of 1 indicates that the beam failure occurs for both the TRP1 and TRP2. When the second BFR MAC CE is the bfr MAC CE corresponding to the TRP2, the value of the bit0 is 1. At the time, the value of the first identification field is 10.

In one example, the serving cell includes two TRPs: a TRP1 and a TRP2. The first identification field includes a bit0 and bit1. In response to the bit0 and bit1 with a value of 00, it is indicated that the beam failure occurs for the TRP1; in response to the bit0 and bit1 with a value of 01, it is indicated that the beam failure occurs for the TRP2; and in response to the bit0 and bit1 with a value of 11, it is indicated that the beam failure occurs for the TRP1 and TRP2. When indicating that the beam failure occurs for the TRP2, the value of the first identification field is 01.

In the embodiments of the present disclosure, there is no restriction on the representation of the TRP identification of the second TRP, which indicates that the beam failure occurs for the second TRP.

In case that the second TRP includes multiple TRPs, the first indication information indicates whether an available beam for the multiple TRPs exists.

In case that the second TRP includes multiple TRPs, at least one first available beam may include available identification of the multiple TRPs, and a sequence of multiple first available beams corresponds to a sequence of the TRPs corresponding to the multiple first available beams.

In one example, at least one first available beam includes a beam 1 and a beam 2, and the beam 1 and beam 2 are the respective available beams for the TRP2 and TRP3 included in the second TRP.

In some embodiments, the target BFR MAC CE is a third BFR MAC CE. In case that the terminal device has not transmitted the BFR MAC CE corresponding to the first TRP, the terminal device transmits the third BFR MAC CE, where the third BFR MAC CE is the BFR MAC CE corresponding to the serving cell.

In some embodiments, the target BFR MAC CE is the third BFR MAC CE. In case that the network device has not received the BFR MAC CE corresponding to the first TRP, the network device receives the third BFR MAC CE, where the third BFR MAC CE is the BFR MAC CE corresponding to the serving cell.

In case that the terminal device determines that the beam failure occurs for all TRPs, the terminal device does not transmit the BFR MAC CE corresponding to the first TRP, but transmits the third BFR MAC CE to indicate that the beam failure occurs for all TRPs. In case that the network device has not received the BFR MAC CE corresponding to the first TRP, the network device receives the third BFR MAC CE, and determines that the beam failure occurs for all TRPs in the serving cell.

Here, a format of the third BFR MAC CE is shown in FIGS. 2 and 3, which will not be elaborated herein.

In some embodiments, the target BFR MAC CE is the first BFR MAC CE. In case that the terminal device has not transmitted the BFR MAC CE corresponding to the first TRP, the terminal device transmits the first BFR MAC CE; or, the terminal device transmits the first BFR MAC CE directly.

In case that the process of the terminal device directly transmitting the first BFR MAC CE may be understood as the process of the terminal device determining that the beam failure occurs for all TRPs in the serving cell, the terminal device transmits the first BFR MAC CE to the network device regardless of whether the BFR MAC CE corresponding to the first TRP is transmitted to the network device.

In some embodiments, the target BFR MAC CE is the first BFR MAC CE.

In case that the network device has not received the BFR MAC CE corresponding to the first TRP, the network device receives the first BFR MAC CE.

Or, the network device receives the first BFR MAC CE directly.

In case that the network device receives the first BFR MAC CE directly, before receiving the first BFR MAC CE, the network device may receive the BFR MAC CE corresponding to the first TRP, or may not receive the BFR MAC CE corresponding to the first TRP.

In some embodiments, the first BFR MAC CE includes at least one of the following:

cell identification of the serving cell;

BWP identification;

TRP identifications of the at least two TRPs;

bits for indicating whether the beam failure occurs for the respective TRPs, different bits corresponding to different TRPs;

second indication information, the second indication information indicating whether a second available beam exists, and the second available beam being an available beam for one of the TRPs; or, at least one second available beam.

The representation of the TRP identifications of the at least two TRPs in the first BFR MAC CE may refer to that of the TRP identification of the second TRP in the third BFR MAC CE. The difference between lies in that: the TRP identifications of the at least two TRPs in the first BFR MAC CE indicate that the beam failure occurs for all TRPs in the serving cell or occurs for all TPRs, but the TRP identification of the second TRP in the third BFR MAC CE indicates that the beam failure occurs for the second TRP in the serving cell or occurs for the second TPR, where the second TRP is a part of TRPs in the serving cell.

In case that the TRP identifications of the at least two TRPs indicates that the beam failure occurs for all TRPs in the serving cell, the second indication information may not be included in the first BFR MAC CE.

In the embodiments of the present disclosure, the terminal device may measure a candidate beam corresponding to the TRPs, to determine whether a new beam meeting a first threshold exists, and further take the new beam meeting the first threshold as the available beam for the TRPs.

In some embodiments, the first BFR MAC CE further includes at least one of the following:

third indication information, the third indication information indicating whether a cell beam failure occurs;

fourth indication information, the fourth indication information indicating whether a third available beam exists, and the third available beam being an available beam for the serving cell; or at least one third available beam.

In an embodiment, the terminal device determines that the beam failure occurs for all TRPs in the serving cell, and does not trigger a cell beam failure recovery procedure. At the time, the third indication information indicates that cell beam failure does not occur.

In an embodiment, the terminal device determines that the beam failure occurs for all TRPs in the serving cell, and triggers the cell beam failure recovery procedure. At the time, the third indication information indicates that the cell beam failure occurs.

When the terminal device transmits, to the network device, the third indication information indicating that the cell beam failure occurs, the network device receives the third indication information indicating that the cell beam failure occurs. The network device indicates to the terminal device a new beam for the serving cell, and further communicates with the terminal device by using the new beam.

In the embodiments of the present disclosure, in case that the cell beam failure recovery is triggered, the terminal device may measure a candidate beam corresponding to the cell, to determine whether a new beam meeting a second threshold exists, and take the new beam meeting the second threshold as an available beam (i.e., a third available beam) for the serving cell.

In some embodiments, the terminal device receives a beam failure indication for one of the TRPs reported by a bottom layer, where the beam failure indication is used for beam failure detection of the TRP.

The terminal device receives the beam failure indication for the one of the TRPs reported by the bottom layer, and further performs the beam failure detection. The process of performing the beam failure detection includes the following operation.

A physical layer of the terminal device detects a beam corresponding to a PDCCH, and further reports a BFI to a MAC in response to detecting the beam failure. For a MAC entity, whenever the physical layer reports the BFI, the UE adds 1 to a BFI_COUNTER and restarts a beam failure detection timer (beamFailureDetectionTimer). In response to the BFI_COUNTER reaching the maximum value during the running of the beamFailureDetectionTimer, it is considered that the failure beam occurs.

In some embodiments, the method further includes the following operation.

The terminal device performs a cell beam failure recovery procedure.

Here, the cell beam failure recovery procedure is a process of updating a downlink transmission beam for the cell based on the random access procedure. When the terminal device performs the cell beam failure recovery procedure, the terminal device triggers the random access procedure, and further performs the cell beam recovery based on the triggered random access procedure.

In the embodiments of the present disclosure, in case that the beam failure recovery procedure for the TRP includes the random access procedure, the random access procedure triggered by the cell beam failure and the random access procedure triggered by the TRP beam failure can be the same.

In some embodiments, the serving cell includes at least one of the following: a primary cell, a primary secondary cell, or a secondary cell.

In some embodiments, the representation of the TRPs includes at least one of the following:

a control-resource set (CORESET);

a CORESET pool; or a reference signal set.

The wireless communication method provided by the embodiments of the present disclosure is further explained below.

When the beam failure occurs for all TRPs in the serving cell, the terminal device triggers the beam failure recovery procedure.

The beam failure recovery procedure includes one of the following procedures.

Procedure 1, the random access procedure is triggered.

Option 1: the network configures a random access resource configuration for a TRP BFR, and the terminal device triggers the random access procedure by using the configuration. After receiving the corresponding MSG1/A, the network may determine, based on the resource used by the terminal device, that the beam failure occurs for all TRPs in the current cell.

Option 2: the network does not configure the random access resource configuration for the TRP BFR but configures a random access resource configuration for a CELL BFR, and the terminal device triggers the random access procedure by using the CELL BFR configuration. In an embodiment, the first indication information is reported through the MSG3/A, and the first indication information indicates that the beam failure occurs for all TRPs of the cell.

Option 3: the network does not configure the random access resource configuration for the TRP BFR or the random access resource configuration for the CELL BFR, and the terminal device triggers the random access procedure by using a contention-based random access (CBRA) resource. In an embodiment, the first indication information is reported through the MSG3/A, and the first indication information indicates that the beam failure occurs for all TRPs of the cell.

Option 4: the network does not configure the random access resource configuration for the TRP BFR or the random access resource configuration for the CELL BFR, and the terminal device transmits the first indication information after the random access procedure succeeds.

In an embodiment, the first indication information may be a BFR MAC CE, and the BFR MAC CE may include at least one of the following:

- cell identification;
- BWP identification;
- TRP identification, which explicitly carries a BFD-RS set ID or implicitly represents two TRPs through one bit, for example, the bit with a value of 1 indicates that the beam failure occurs for the TRP1 and the bit with a value of 0 indicates that the beam failure occurs for the TRP2;
- a bitmap for indicating whether the beam failure occurs for the respective TRPs, where each bit in the bitmap corresponds to one TRP, if the bit corresponding to the TRP is set to 1, it is indicated that the beam failure occurs for the TRP; otherwise, it is indicated that the beam failure does not occur for the TRP;
- indication of whether an available beam exists; or
- at least one available beam ID (if exists), where if more than one available beam ID exist, different available beam IDs correspond to different TRPs for which the beam failure occurs.

Procedure 2, the BFR MAC CE is reported.

- Option 1: if the terminal device has transmitted a beam failure recovery MAC CE corresponding to the first TRP and has not received feedback information (i.e., the BFR is not completed), the terminal device transmits the BFR MAC CE (i.e., a first MAC CE) corresponding to the second TRP.
- Option 2: if the terminal device has not transmitted the beam failure MAC CE corresponding to the first TRP, the terminal device transmits the cell BFR MAC CE (i.e., a second MAC CE: a R16 BFR MAC CE).
- Option 3: if the terminal device has not transmitted the beam failure MAC CE corresponding to the first TRP, the terminal device transmits a third MAC CE (which is same with the first indication information mentioned above).
- Option 4: the terminal device transmits the third MAC CE directly.

In an embodiment, the first BFR MAC CE includes at least one of the following:

- cell identification;
- BWP identification;
- TRP identification, which explicitly carries a BFD-RS set ID or implicitly represents two TRPs through one bit, for example, the bit with a value of 1 indicates that the beam failure occurs for the TRP1 and the bit with a value of 0 indicates that the beam failure occurs for the TRP2;
- indication of whether an available beam exists; or
- available beam ID(s) (if exists), where if more than one available beam ID exist, different available beam IDs corresponds to different TRPs for which the beam failure occurs.

In the embodiments of the present disclosure, different TRPs may be indicated by different CORESETs, or indicated by different CORESET pools, or indicated by different reference signal sets.

In the embodiments of the present disclosure, before the occurrence of the beam failure, the terminal device determines, based on the beam failure indication reported by the bottom layer, whether the beam failure occurs. For example, if the BFI for the TPR reaches the BFI maximum value (i.e., beamFailureInstanceMaxCount) during the running of the beamFailureDetectionTimer, it is considered that the failure beam occurs for the TPR.

In the embodiment of the present disclosure, the serving cell may be a primary cell, a primary secondary cell, or a secondary cell.

In the embodiments of the present disclosure, if the beam failure occurs for all TRPs in the cell, the beam failure is further triggered to occur for the cell.

The third MAC CE may be further extended to include the following:

- cell identification;
- BWP identification;
- TRP identification, which explicitly carries a BFD-RS set ID or implicitly represents two TRPs through one bit, for example, the bit with a value of 1 indicates that the beam failure occurs for the TRP1 and the bit with a value of 0 indicates that the beam failure occurs for the TRP2;
- a bitmap for indicating whether the beam failure occurs for the respective TRPs, where each bit in the bitmap corresponds to one TRP, if the bit corresponding to the TRP is set to 1, it is indicated that the beam failure occurs for the TRP; otherwise, it is indicated that the beam failure does not occur for the TRP;
- indication of whether an available beam for the TRP exists;
- at least one available beam ID (if exists) for the TRP, where if more than one available beam ID exist, different available beam IDs correspond to different TRPs for which the beam failure occurs.
- indication of whether the cell beam failure occurs;
- indication of whether an available beam for the cell exists; or
- beam identification, if the available beam for the cell exists.

Preferred embodiments of the present disclosure have been described in detail with reference to the accompanying drawings, but the present disclosure is not limited to the specific details of the aforementioned embodiments. Within the scope of the technical conception of the present disclosure, various simple modifications can be made to the technical schemes of the present disclosure, and such simple modifications all belong to the scope of protection of the present disclosure. For example, each of the specific technical features described in the aforementioned specific implementations may be combined in any suitable manner without contradiction, and various possible combinations are not further described in the present disclosure in order to avoid unnecessary repetition. For another example, any combination may be made between the various implementations of the present disclosure so long as it does not depart from the idea of the present disclosure, and is likewise to be regarded as the content of the present disclosure. For another example, on the premise of no conflict, various embodiments described In the present disclosure and/or the technical features in each of the embodiments can be combined with the prior art at will. The technical schemes acquired after the combination should also fall within the scope of protection of the present disclosure.

It should also be noted that, in the various method embodiments of the present disclosure, the size of the sequence number of the aforementioned processes does not mean the sequence of execution. The sequence of execution of the processes should be determined by their functions and inherent logic, and should not constitute any limitation on the implementation processes of the embodiments of the present disclosure. Further, in the embodiments of the present disclosure, the terms “downlink”, “uplink” and “sidelink” are used to represent a transmission direction of the signal or data. Here, “downlink” is used to represent the transmission direction of the signal or data as a first direction transmitted from a station to a user device of a cell; “uplink” is used to represent the transmission direction of the signal or data as a second direction transmitted from the user device of the cell to the station; and “sidelink” is used to represent the transmission direction of the signal or data as a third direction transmitted from a user device 1 to a user device 2. For example, “downlink signal” is used to represent the transmission direction of the signal is the first direction. Additionally, in the embodiments of the present disclosure, the term “and/or” only indicates an association relationship for describing associated objects and represents that there are three relationships. Specifically, A and/or B may represent three conditions: i.e., independent existence of A, existence of both A and B and independent existence of B. In addition, the character “/” in the present disclosure usually represents that previous and next associated objects form an “or” relationship.

Figure 7:
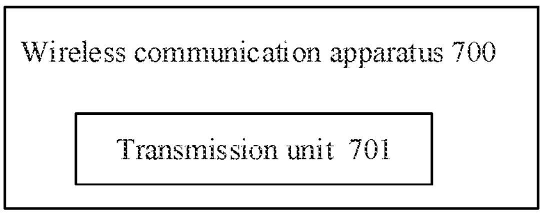
FIG. 7 is an optional schematic structural diagram of a wireless communication apparatus according to an embodiment of the present disclosure.

As shown in FIG. 7, a wireless communication apparatus 700 provided by the embodiments of the present disclosure is applied to a terminal device, and includes a transmission unit 701.

The transmission unit 701 is configured to, in response to the terminal device determining that a beam failure occurs for at least two transmission receive points (TRP) in a serving cell, transmit first information to a network device, the first information indicating that the beam failure occurs for the at least two TRPs.

In some embodiments, the transmission unit 701 is further configured to:

- transmit the first information to the network device through a first message in a random access procedure; or
- transmit the first information to the network device through a second message after the random access procedure succeeds; or
- transmit the first information to the network device through a target beam failure recovery (BFR) medium access control (MAC) control element (CE).

In some embodiments, the first message is a message 1 or message A in the random access procedure, the message 1 or message A is transmitted by using a first resource, the first resource is a random access resource for the TRP BFR, and the first resource indicates the first information.

In some embodiments, in case that the terminal device is configured with a random access resource for the TRP BFR, the message 1 or message A is transmitted by using the random access resource for the TRP BFR.

In some embodiments, the first message is a message 3 or message A in the random access procedure, the first information is carried in the first message, the message 1 or message A is transmitted by using a second resource or a third resource, the second resource is a random access resource for a cell BFR, and the third resource is a contention-based random access resource.

In some embodiments, in case that the terminal device is not configured with the random access resource for the TRP BFR but is configured with the random access resource for the cell BFR, the message 1 or message A is transmitted by using the random access resource for the cell BFR.

Or, in case that the terminal device is not configured with the random access resource for the TRP BFR and is not configured with the random access resource for the cell BFR, the message 1 or message A is transmitted by using the contention-based random access resource.

In some embodiments, the second message is an uplink message after the random access procedure succeeds, and the first information is carried in the uplink message.

In some embodiments, in case that the terminal device is not configured with the random access resource for the TRP BFR and is not configured with the random access resource for the cell BFR, the random access procedure is initiated by using the contention-based random access resource.

In some embodiments, the first information is a first BFR MAC CE, and the first BFR MAC CE corresponds to the at least two TRPs.

In some embodiments, the target BFR MAC CE is a second BFR MAC CE.

In case that the terminal device has transmitted a BFR MAC CE corresponding to a first TRP and has not received a correct reception feedback for the BFR MAC CE corresponding to the first TRP, the terminal device transmits the second BFR MAC CE. The second BFR MAC CE is a BFR MAC CE corresponding to a second TRP, and the first TRP and the second TRP are different TRPs among the at least two TRPs.

In some embodiments, the second BFR MAC CE includes at least one of the following:

- cell identification of the serving cell;
- bandwidth part (BWP) identification;
- TRP identification of the second TRP;
- first indication information, the first indication information indicating whether
- a first available beam exists, and the first available beam being an available beam for the second TRP; or
- at least one first available beam.

In some embodiments, the target BFR MAC CE is a third BFR MAC CE.

In case that the terminal device has not transmitted the BFR MAC CE corresponding to the first TRP, the terminal device transmits the third BFR MAC CE, the third BFR MAC CE being a BFR MAC CE corresponding to the serving cell.

In some embodiments, the target BFR MAC CE is a first BFR MAC CE.

In case that the terminal device has not transmitted the BFR MAC CE corresponding to the first TRP, the terminal device transmits the first BFR MAC CE.

Or, the terminal device transmits the first BFR MAC CE directly.

In some embodiments, the first BFR MAC CE includes at least one of the following:

- cell identification of the serving cell;

BWP identification;

TRP identifications of the at least two TRPs;

bits for indicating whether the beam failure occurs for the respective TRPs, different bits corresponding to different TRPs;

second indication information, the second indication information indicating whether a second available beam exists, and the second available beam being an available beam for one of the TRPs; or, at least one second available beam.

In some embodiments, the first BFR MAC CE further includes at least one of the following:

third indication information, the third indication information indicating whether a cell beam failure occurs;

fourth indication information, the fourth indication information indicating whether a third available beam exists, the third available beam being an available beam for the serving cell; or at least one third available beam.

In some embodiments, the apparatus 700 further includes a detection unit.

The detection unit is configured to receive a beam failure indication for one of the TRPs reported by a bottom layer, where the beam failure indication is used for beam failure detection of the TRP.

In some embodiments, the apparatus 700 further includes a first execution unit.

The first execution unit is configured to perform a cell beam failure recovery procedure.

In some embodiments, the serving cell includes at least one of the following:

a primary cell, a primary secondary cell, or a secondary cell.

In some embodiments, the representation of the TRPs may include at least one of the following:

a control resource set (CORESET);

a CORESET pool; or a reference signal set.

Figure 8:
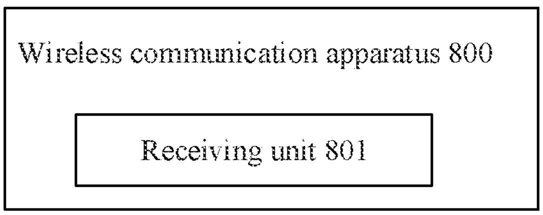
FIG. 8 is an optional schematic structural diagram of a wireless communication apparatus according to an embodiment of the present disclosure.

As shown in FIG. 8, a wireless communication apparatus 800 provided by the embodiments of the present disclosure is applied to a network device, and includes a receiving unit 801.

The receiving unit 801 is configured to receive first information from a terminal device. The first information indicates that a beam failure occurs for at least two transmission receiving points (TRP) in a serving cell of the terminal device.

In some embodiments, the receiving unit 801 is further configured to:

receive the first information from the terminal device through a first message in a random access procedure; or receive the first information from the terminal device through a second message after the random access procedure succeeds; or receive the first information from the terminal device through a target beam failure recovery (BFR) medium access control (MAC) control element (CE).

In some embodiments, the first message is a message 1 or message A in the random access procedure, the message 1 or message A is transmitted by using a first resource, the first resource is a random access resource for the TRP BFR, and the first resource indicates the first information.

In some embodiments, in case that the terminal device is configured with a random access resource for the TRP BFR, the message 1 or message A is transmitted by using the random access resource for the TRP BFR.

In some embodiments, the first message is a message 3 or message A in the random access procedure, the first information is carried in the first message, the message 1 or message A is transmitted by using a second resource or a third resource, the second resource is a random access resource for a cell BFR, and the third resource is a contention-based random access resource.

In some embodiments, in case that the terminal device is not configured with the random access resource for the TRP BFR but is configured with the random access resource for the cell BFR, the message 1 or message A is transmitted by using the random access resource for the cell BFR.

Or, in case that the terminal device is not configured with the random access resource for the TRP BFR and is not configured with the random access resource for the cell BFR, the message 1 or message A is transmitted by using the contention-based random access resource.

In some embodiments, the second message is an uplink message after the random access procedure succeeds, and the first information is carried in the uplink message.

In some embodiments, in case that the terminal device is not configured with a random access resource for a TRP BFR and is not configured with the random access resource for the cell BFR, the random access procedure is initiated by using a contention-based random access resource.

In some embodiments, the first information is a first BFR MAC CE, and the first BFR MAC CE corresponds to the at least two TRPs.

In some embodiments, the target BFR MAC CE is a second BFR MAC CE.

In case that the network device has received a BFR MAC CE corresponding to a first TRP and has not transmitted a correct reception feedback for the BFR MAC CE corresponding to the first TRP, the network device receives the second BFR MAC CE. The second BFR MAC CE is a BFR MAC CE corresponding to a second TRP, and the first TRP and the second TRP are different TRPs among the at least two TRPs.

In some embodiments, the second BFR MAC CE includes at least one of the following:

cell identification of the serving cell;

bandwidth part (BWP) identification;

TRP identification of the second TRP;

first indication information, the first indication information indicating whether a first available beam exists, and the first available beam being an available beam for the second TRP; or at least one first available beam.

In some embodiments, the target BFR MAC CE is a third BFR MAC CE.

In case that the network device has not received the BFR MAC CE corresponding to the first TRP, the network device receives the third BFR MAC CE. The third BFR MAC CE is a BFR MAC CE corresponding to the serving cell.

In some embodiments, the target BFR MAC CE is a first BFR MAC CE.

In case that the network device has not received the BFR MAC CE corresponding to the first TRP, the network device receives the first BFR MAC CE.

Or, the network device receives the first BFR MAC CE directly.

In some embodiments, the first BFR MAC CE includes at least one of the following:

cell identification of the serving cell;

BWP identification;

TRP identifications of the at least two TRPs;

bits for indicating whether the beam failure occurs for the respective TRPs, different bits corresponding to different TRPs;

second indication information, the second indication information indicating whether a second available beam exists, and the second available beam being an available beam for one of the TRPs; or, at least one second available beam.

In some embodiments, the first BFR MAC CE further includes at least one of the following:

third indication information, the third indication information indicating whether a cell beam failure occurs;

fourth indication information, the fourth indication information indicating whether a third available beam exists, the third available beam being an available beam for the serving cell; or at least one third available beam.

In some embodiments, the apparatus 700 further includes a second execution unit.

The second execution unit is configured to perform the cell beam failure recovery procedure for the network device.

In some embodiments, the serving cell includes at least one of the following:

a primary cell, a primary secondary cell, or a secondary cell.

In some embodiments, the representation of the TRPs may include at least one of the following:

a control resource set (CORESET);

a CORESET pool; or a reference signal set.

Those skilled in the art should understand that, the relevant description of the aforementioned wireless communication apparatus according to the embodiments of the present disclosure may be understood with reference to the relevant description of the wireless communication methods according to the embodiments of the present disclosure.

Figure 9:
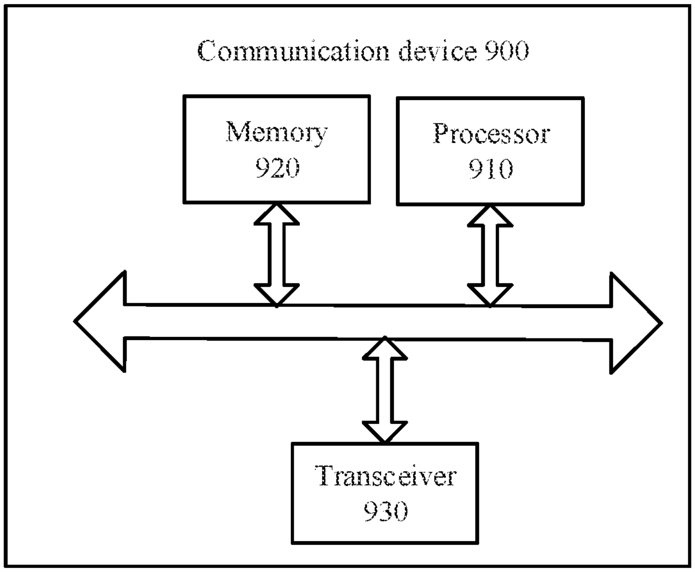
FIG. 9 is a schematic structural diagram of a communication device according to an embodiment of the present disclosure.

FIG. 9 is a schematic structural diagram of a communication device 900 according to an embodiment of the present disclosure. The communication device 900 may be a terminal device or a network device. The communication device 900 illustrated in FIG. 9 includes a processor 910, and the processor 910 may call and run a computer program from a memory to implement the methods in the embodiment of the present disclosure.

In an embodiment, as shown in FIG. 9, the communication device 900 may further include a memory 920. Herein, the processor 910 may call and run the computer program from the memory 920 to implement the methods in the embodiment of the present disclosure.

Here, the memory 920 may be a separate device independent of the processor 910 or may be integrated in the processor 910.

In an embodiment, as shown in FIG. 9, the communication device 900 may further include a transceiver 930, and the processor 910 may control the transceiver 930 to communicate with other devices. Specifically, the transceiver 930 may transmit information or data to other devices, or receive information or data from other devices.

Here, the transceiver 930 may include a transmitter and a receiver. The transceiver 930 may further include one or more antennas.

In an embodiment, the communication device 900 may specifically be the network device of the embodiments of the present disclosure. The communication device 900 may implement the corresponding process implemented by the network device in each method of the embodiments of the present disclosure. For brevity, details will not be repeated herein again.

In an embodiment, the communication device 900 may be the mobile terminal/terminal device of the embodiments of the present disclosure. The communication device 900 may implement the corresponding process implemented by the mobile terminal/terminal device in each method of the embodiments of the present disclosure. For brevity, details will not be repeated herein again.

Figure 10:
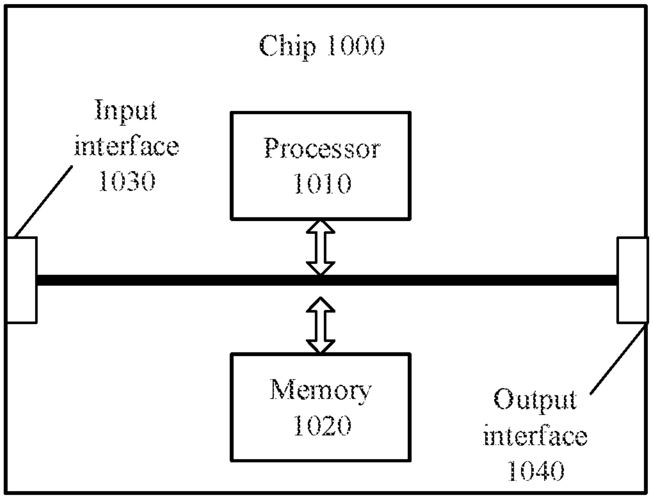
FIG. 10 is a schematic structural diagram of a chip according to an embodiment of the present disclosure.

FIG. 10 is a schematic structural diagram of a chip according to an embodiment of the present disclosure. The chip 1000 illustrated in FIG. 10 includes a processor 1010, and the processor 1010 may call and run a computer program from a memory to implement the methods in the embodiments of the present disclosure.

In an embodiment, as shown in FIG. 10, the chip 1000 may further include a memory 1020. Here, the processor 1010 may call and run the computer program from the memory 1020 to implement the methods in the embodiments of the present disclosure.

Here, the memory 1020 may be a separate device independent of the processor 1010 or may be integrated in the processor 1010.

In an embodiment, the chip 1000 may further include an input interface 1030. Herein, the processor 1010 may control the input interface 1030 to communicate with other devices or chips. Specifically, the input interface 1030 may acquire information or data from other devices and chips.

In an embodiment, the chip 1000 may further include an output interface 1040. Herein, the processor 1010 may control the output interface 1040 to communicate with other devices or chips. Specifically, the output interface 1040 may output information or data to other devices and chips.

In an embodiment, the chip may be applied to the mobile terminal/terminal device in the embodiments of the present disclosure, and the chip may implement the corresponding process implemented by the mobile terminal/terminal device in each method of the embodiments of the present disclosure. For brevity, details will not be repeated herein again.

It should be understood that the chip mentioned in the embodiments of the present disclosure may also be referred as a system-level chip, a system chip, a chip system, or a system-on chip, etc.

Figure 11:
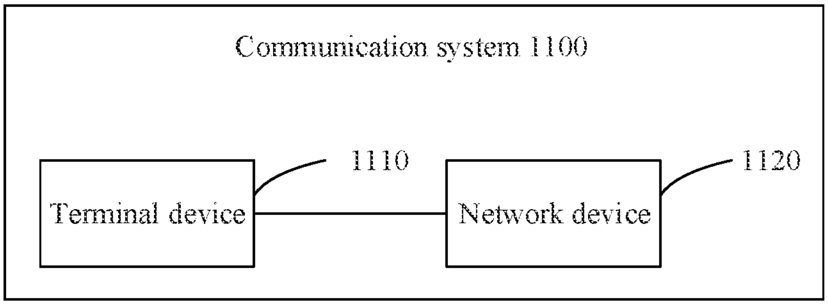
FIG. 11 is a schematic block of a communication system according to an embodiment of the present disclosure.

FIG. 11 is a schematic block of a communication system 1100 according to an embodiment of the present disclosure. As shown in FIG. 11, the communication system 1100 includes a terminal device 1110 and a network device 1120.

Herein, the terminal device 1110 may be configured to implement the functions implemented by the terminal device in the foregoing method, and the network device 1120 may be configured to implement the functions implemented by the network device in the foregoing methods. For brevity, details are not described herein again.

It is to be understood that the processor in the embodiments of the present disclosure may be an integrated circuit chip and has a signal processing capability. In an implementation process, each step of the method embodiments may be completed by an integrated logical circuit of hardware or an instruction in a software form in the processor. The processor may be a universal processor, a digital signal processor (DSP), an application specific integrated circuit (ASIC), a field programmable gate array (FPGA) or another programmable logical device, discrete gate or transistor logical device and discrete hardware component. Each method, step and logical block diagram disclosed in the embodiments of the present disclosure may be implemented or executed. The general purpose processor may be a microprocessor or the processor may be any conventional processor or the like. The operations of the method disclosed in combination with the embodiments of the present disclosure may be directly embodied to be executed and implemented by a hardware decoding processor or executed and implemented by a combination of hardware and software modules in the decoding processor. The software module may be located in a mature storage medium in this field such as a random access memory (RAM), a flash memory, a read-only memory (ROM), a programmable ROM (PROM) or electrically erasable PROM (EEPROM) and a register. The storage medium is located in a memory, and the processor reads information in the memory, and implements the steps of the methods in combination with hardware.

It can be understood that the memory in the embodiments of the present disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, which is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It is to be noted that the memory of a system and method described in the present disclosure is intended to include, but not limited to, memories of these and any other proper types.

It can be understood that the above memory is described only exemplarily rather than limitedly. For example, the memory in the embodiments of the present disclosure may be a SRAM, a DRAM, a SDRAM, a DDR SDRAM, an ESDRAM, a SLDRAM, a DR RAM and the like. That is, the memory in the embodiments of the present disclosure is intended to include, but not limited to, memories of these and any other proper types.

The embodiments of the present disclosure further provide a computer-readable storage medium for storing a computer program.

In an embodiment, the computer-readable storage medium may be applied to the network device in the embodiments of the present disclosure, and the computer program is executed to enable the computer to perform processes implemented by the network device in each method of the embodiments of the present disclosure. For brevity, details will not be repeated herein again.

In an embodiment, the computer-readable storage medium may be applied to the mobile terminal/terminal device in the embodiments of the present disclosure, and the computer program enables the computer to perform the processes implemented by the mobile terminal/terminal device in each method of the embodiments of the present disclosure. For brevity, details will not be repeated herein again.

The embodiments of the present disclosure further provide a computer program product, including computer program instructions.

In an embodiment, the computer program product may be applied to the network device in the embodiments of the present disclosure, and the computer program instructions are executed to enable the computer to perform the processes implemented by the network device in each method of the embodiments of the present disclosure. For brevity, details will not be repeated herein again.

In an embodiment, the computer program product may be applied to the mobile terminal/terminal device in the embodiments of the present disclosure, and the computer program instructions are executed to enable the computer to perform the processes implemented by the mobile terminal/terminal device in each method of the embodiments of the present disclosure. For brevity, details will not be repeated herein again.

The embodiments of the present disclosure further provide a computer program.

In an embodiment, the computer program may be applied to the network device in the embodiments of the present disclosure, and the computer program is run on a computer, to enable the computer to perform the processes implemented by the network device in each method of the embodiments of the present disclosure. For brevity, details will not be repeated herein again.

In an embodiment, the computer program may be applied to the mobile terminal/terminal device in the embodiments of the present disclosure, and the computer program is run on a computer, to enable the computer to perform the processes implemented by the mobile terminal/terminal device in each method of the embodiments of the present disclosure. For brevity, details will not be repeated herein again.

Embodiments of the present disclosure provide a wireless communication method, a wireless communication apparatus, a terminal device and a network device.

A wireless communication method is provided by the embodiments of the present disclosure, and the method includes the following operation.

In response to determining that a beam failure occurs for at least two transmission receive points (TRP) in a serving cell, a terminal device transmits first information to a network device, the first information indicating that the beam failure occurs for the at least two TRPs.

A wireless communication method is provided by the embodiments of the present disclosure, and the method includes the following operation.

A network device receives first information from a terminal device, the first information indicating that a beam failure occurs for at least two transmission receiving points (TRP) in a serving cell of the terminal device.

A wireless communication apparatus is provided by the embodiments of the present disclosure, and the apparatus includes a transmission unit.

The transmission unit is configured to, in response to a terminal device determining that a beam failure occurs for at least two transmission receive points (TRP) in a serving cell, transmit first information to a network device, the first information indicating that the beam failure occurs for the at least two TRPs.

A wireless communication apparatus is provided by the embodiments of the present disclosure, and the apparatus includes a receiving unit.

The receiving unit is configured to receive first information from a terminal device, the first information indicating that a beam failure occurs for at least two transmission receiving points (TRP) in a serving cell of the terminal device.

A terminal device is provided by the embodiments of the present disclosure, and the terminal device may be a first terminal device. The terminal device includes a processor and a memory. The memory is configured to store a computer program, and the processor is configured to call and run the computer program stored in the memory to execute each of the wireless communication methods described above.

A network device is provided by the embodiments of the present disclosure, and the network device includes a processor and a memory. The memory is configured to store a computer program, and the processor is configured to call and run the computer program stored in the memory to execute each of the wireless communication methods described above.

A chip is provided by the embodiments of the present disclosure, and the chip is configured to implement each of the wireless communication methods described above.

Specifically, the chip includes a processor, and the processor is configured to call and run a computer program in a memory to enable a device installed with the chip to execute each of the wireless communication methods described above.

A computer-readable storage medium is provided by the embodiments of the present disclosure, which is used for storing a computer program. The computer program, when executed by a computer, enables the computer to execute each of the wireless communication methods described above.

A computer program product is provided by the embodiments of the present disclosure, and the computer program product includes computer program instructions. The computer program instructions, when executed by a computer, enable the computer to execute each of the wireless communication methods described above.

A computer program is provided by the embodiments of the present disclosure, which enables a computer to execute each of the wireless communication methods described above.

Based on the aforementioned technical schemes, the terminal device determines that the beam failure occurs for the at least two TRPs in the serving cell, and transmits the first information to the network device. The network device receives the first information from the terminal device. Here, the first information indicates that the beam failure occurs for the at least two TRPs in the serving cell. Therefore, when the beam failure occurs for the at least two TRPs in the serving cell, the network device is notified that the beam failure occurs for the at least two TRPs in the serving cell.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical schemes. Professionals may realize the described functions for each specific application by use of different methods, but such realization shall fall within the scope of the present disclosure.

Those skilled in the art may clearly learn about that for the specific working process of the systems, devices and units described above, reference may be made to the corresponding processes in the method embodiments, and the specific working process of the systems, devices and units will not be elaborated herein for convenient and brief description.

In some embodiments provided by the present disclosure, it should be noted that the disclosed systems, devices and methods may be implemented in another manner. For example, the device embodiments described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the devices or the units, and may be electrical and mechanical or adopt other forms.

The units described as separate parts may or may not be physically separated, and parts displayed as units may or may not be physical units, that is, may be located in the same place, or may also be distributed to multiple network units. A part or all of the units may be selected to achieve the purpose of the schemes of the embodiments according to practical requirements.

In addition, functional units in each embodiment of the application may be integrated into a processing unit, each functional unit may also physically exist independently, and two or more than two functional units may also be integrated into a unit.

If the above functions are implemented in the form of a software function module and sold or used as an independent product, the functions may also be stored in a computer-readable storage medium. Based on such understanding, the essential part of the technical schemes of the embodiments of the present disclosure or a part of the technical schemes that contributes to related technologies or a part of the technical schemes can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

The foregoing is only the embodiments of the present disclosure, but the protection scope of the present disclosure is not limited thereto. Variation and substitution which can be readily thought by those skilled in the art within the technical scope disclosed in the present disclosure should fall within the protection scope of the present disclosure. Therefore, the protection scope of this disclosure should be subject to the protection scope of the claims.

What is claimed is:

1. A wireless communication method, comprising:

determining, by a terminal device, that a beam failure occurs for at least two transmission receive points (TRP) in a serving cell; and transmitting, by the terminal device, first information to a network device, the first information indicating that the beam failure occurs for the at least two TRPs;

wherein transmitting, by the terminal device, the first information to the network device comprises:

transmitting, by the terminal device, the first information to the network device through a second message after a random access procedure succeeds, wherein the second message is an uplink message after the random access procedure succeeds, and the first information is carried in the uplink message; and in a case that the terminal device is not configured with a random access resource for a TRP beam failure recovery (BFR) and is not configured with a random access resource for a cell BFR, the random access procedure is initiated by using a contention-based random access resource; or, transmitting, by the terminal device, the first information to the network device through a target BFR medium access control (MAC) control element (CE), wherein the target BFR MAC CE comprises one of the following:

a second BFR MAC CE, the second BFR MAC CE being a BFR MAC CE corresponding to a second TRP among the at least two TRPs, and the second BFR MAC CE indicating that the beam failure occurs for the second TRP in the serving cell;

a third BFR MAC CE, the third BFR MAC CE being a BFR MAC CE corresponding to the serving cell, and the third BFR MAC CE indicating that the beam failure occurs for the serving cell; or a first BFR MAC CE, the first BFR MAC CE being a BFR MAC CE corresponding to the at least two TRPs in the serving cell, and the first BFR MAC CE indicating that the beam failure occurs for all TRPs in the serving cell.

2. The method of claim 1, wherein in a case of transmitting, by the terminal device, the first information to the network device through the second message after the random access procedure succeeds, the first information is a first BFR MAC CE, and the first BFR MAC CE corresponds to the at least two TRPs.

3. The method of claim 1, wherein the target BFR MAC CE comprises the second BFR MAC CE; and in a case that the terminal device has transmitted a BFR MAC CE corresponding to a first TRP and has not received a correct reception feedback for the BFR MAC CE corresponding to the first TRP, transmitting, by the terminal device, the second BFR MAC CE, the first TRP and the second TRP being different TRPs among the at least two TRPs, and the second TRP comprising one or more TRPs.

4. The method of claim 3, wherein the second BFR MAC CE comprises at least one of the following:

cell identification of the serving cell;

bandwidth part (BWP) identification;

TRP identification of the second TRP; wherein in a case that the second TRP corresponding to the second BFR MAC CE comprises one TRP, the TRP identification of the second TRP represents the TRP or indicates that the beam failure occurs for the TRP; and in a case that the second TRP corresponding to the second BFR MAC CE comprises multiple TRPs, the TRP identification of the second TRP represents the multiple TRPs or indicates that the beam failure occurs for the multiple TRPs;

first indication information, the first indication information indicating whether a first available beam exists, and the first available beam being an available beam for the second TRP; wherein in a case that the second TRP comprises multiple TRPs, the first indication information indicates whether an available beam for the multiple TRPs exists; and in a case that the second TRP comprises the multiple TRPs, at least one first available beam comprises available identification of the multiple TRPs, and a sequence of multiple first available beams corresponds to a sequence of the TRPs corresponding to the multiple first available beams; or at least one first available beam.

5. The method of claim 1, wherein the target BFR MAC CE comprises the third BFR MAC CE; and in a case that the terminal device has not transmitted a BFR MAC CE corresponding to a first TRP, transmitting, by the terminal device, the third BFR MAC CE.

6. The method of claim 1, wherein the target BFR MAC CE comprises the first BFR MAC CE; and in a case that the terminal device has not transmitted a BFR MAC CE corresponding to a first TRP, transmitting, by the terminal device, the first BFR MAC CE; or, transmitting, by the terminal device, the first BFR MAC CE directly.

7. The method of claim 6, wherein the first BFR MAC CE comprises at least one of the following:

cell identification of the serving cell;

bandwidth part (BWP) identification;

TRP identifications of the at least two TRPs;

bits for indicating whether the beam failure occurs for the respective TRPs, different bits corresponding to different TRPs;

second indication information, the second indication information indicating whether a second available beam exists, and the second available beam being an available beam for one of the TRPs;

at least one second available beam;

third indication information, the third indication information indicating whether a cell beam failure occurs;

fourth indication information, the fourth indication information indicating whether a third available beam exists, the third available beam being an available beam for the serving cell; or at least one third available beam.

8. A terminal device, comprising a processor and a memory, wherein the memory is configured to store a computer program, and the processor is configured to call and run the computer program stored in the memory to cause the terminal device to:

determine that a beam failure occurs for at least two transmission receive points (TRP) in a serving cell; and transmit first information to a network device, the first information indicating that the beam failure occurs for the at least two TRPs;

wherein the processor is further configured to call and run the computer program to cause the terminal device to:

transmit the first information to the network device through a second message after a random access procedure succeeds, wherein the second message is an uplink message after the random access procedure succeeds, and the first information is carried in the uplink message; and in a case that the terminal device is not configured with a random access resource for a TRP beam failure recovery (BFR) and is not configured with a random access resource for a cell BFR, the random access procedure is initiated by using a contention-based random access resource; or, transmit the first information to the network device through a target BFR medium access control (MAC) control element (CE), wherein the target BFR MAC CE comprises one of the following:

a second BFR MAC CE, the second BFR MAC CE being a BFR MAC CE corresponding to a second TRP among the at least two TRPs, and the second BFR MAC CE indicating that the beam failure occurs for the second TRP in the serving cell;

a third BFR MAC CE, the third BFR MAC CE being a BFR MAC CE corresponding to the serving cell, and the third BFR MAC CE indicating that the beam failure occurs for the serving cell; or a first BFR MAC CE, the first BFR MAC CE being a BFR MAC CE corresponding to the at least two TRPs in the serving cell, and the first BFR MAC CE indicating that the beam failure occurs for all TRPs in the serving cell.

9. The terminal device of claim 8, wherein in a case of transmitting the first information to the network device through the second message after the random access procedure succeeds, the first information is a first BFR MAC CE, and the first BFR MAC CE corresponds to the at least two TRPs.

10. The terminal device of claim 8, wherein the target BFR MAC CE comprises the second BFR MAC CE; and the processor is further configured to call and run the computer program to cause the terminal device to: transmit the second BFR MAC CE in a case that the terminal device has transmitted a BFR MAC CE corresponding to a first TRP and has not received a correct reception feedback for the BFR MAC CE corresponding to the first TRP, the first TRP and the second TRP are different TRPs among the at least two TRPs, and the second TRP comprises one or more TRPs.

11. The terminal device of claim 10, wherein the second BFR MAC CE comprises at least one of the following:

cell identification of the serving cell;

bandwidth part (BWP) identification;

TRP identification of the second TRP; wherein in a case that the second TRP corresponding to the second BFR MAC CE comprises one TRP, the TRP identification of the second TRP represents the TRP or indicates that the beam failure occurs for the TRP; and in a case that the second TRP corresponding to the second BFR MAC CE comprises multiple TRPs, the TRP identification of the second TRP represents the multiple TRPs or indicates that the beam failure occurs for the multiple TRPs;

first indication information, the first indication information indicating whether a first available beam exists, and the first available beam being an available beam for the second TRP; wherein in a case that the second TRP comprises multiple TRPs, the first indication information indicates whether an available beam for the multiple TRPs exists; and in a case that the second TRP comprises the multiple TRPs, at least one first available beam comprises available identification of the multiple TRPs, and a sequence of multiple first available beams corresponds to a sequence of the TRPs corresponding to the multiple first available beams; or at least one first available beam.

12. The terminal device of claim 8, wherein the target BFR MAC CE comprises the third BFR MAC CE; and the processor is further configured to call and run the computer program to cause the terminal device to: transmit the third BFR MAC CE in a case that the terminal device has not transmitted a BFR MAC CE corresponding to a first TRP.

13. The terminal device of claim 8, wherein the target BFR MAC CE comprises the first BFR MAC CE; and the processor is further configured to call and run the computer program to cause the terminal device to:

transmit the first BFR MAC CE in a case that the terminal device has not transmitted a BFR MAC CE corresponding to a first TRP; or, transmit the first BFR MAC CE directly.

14. A network device, comprising a processor and a memory, wherein the memory is configured to store a computer program, and the processor is configured to call and run the computer program stored in the memory to cause the network device to:

receive first information from a terminal device, the first information indicating that a beam failure occurs for at least two transmission receiving points (TRP) in a serving cell of the terminal device;

wherein the processor is further configured to call and run the computer program to cause the network device to:

receive the first information from the terminal device through a second message after a random access procedure succeeds, wherein the second message is an uplink message after the random access procedure succeeds, and the first information is carried in the uplink message; and in a case that the terminal device is not configured with a random access resource for a TRP beam failure recovery (BFR) and is not configured with a random access resource for a cell BFR, the random access procedure is initiated by using a contention-based random access resource; or, receive the first information from the terminal device through a target BFR medium access control (MAC) control element (CE), wherein the target BFR MAC CE comprises one of the following:

a second BFR MAC CE, the second BFR MAC CE being a BFR MAC CE corresponding to a second TRP among the at least two TRPs, and the second BFR MAC CE indicating that the beam failure occurs for the second TRP in the serving cell;

a third BFR MAC CE, the third BFR MAC CE being a BFR MAC CE corresponding to the serving cell, and the third BFR MAC CE indicating that the beam failure occurs for the serving cell; or a first BFR MAC CE, the first BFR MAC CE being a BFR MAC CE corresponding to the at least two TRPs in the serving cell, and the first BFR MAC CE indicating that the beam failure occurs for all TRPs in the serving cell.

15. The network device of claim 14, wherein in a case of receiving the first information from the terminal device through the second message after the random access procedure succeeds, the first information is a first BFR MAC CE, and the first BFR MAC CE corresponds to the at least two TRPs.

16. The network device of claim 14, wherein the target BFR MAC CE comprises the second BFR MAC CE; and the processor is further configured to call and run the computer program to cause the network device to: receive the second BFR MAC CE in a case that the network device has received a BFR MAC CE corresponding to a first TRP and has not transmitted a correct reception feedback for the BFR MAC CE corresponding to the first TRP, the first TRP and the second TRP are different TRPs among the at least two TRPs, and the second TRP comprises one or more TRPs.

17. The network device of claim 16, wherein the second BFR MAC CE comprises at least one of the following:

cell identification of the serving cell;

bandwidth part (BWP) identification;

TRP identification of the second TRP; wherein in a case that the second TRP corresponding to the second BFR MAC CE comprises one TRP, the TRP identification of the second TRP represents the TRP or indicates that the beam failure occurs for the TRP; and in a case that the second TRP corresponding to the second BFR MAC CE comprises multiple TRPs, the TRP identification of the second TRP represents the multiple TRPs or indicates that the beam failure occurs for the multiple TRPs;

first indication information, the first indication information indicating whether a first available beam exists, and the first available beam being an available beam for the second TRP; wherein in a case that the second TRP comprises multiple TRPs, the first indication information indicates whether an available beam for the multiple TRPs exists; and in a case that the second TRP comprises the multiple TRPs, at least one first available beam comprises available identification of the multiple TRPs, and a sequence of multiple first available beams corresponds to a sequence of the TRPs corresponding to the multiple first available beams; or at least one first available beam.

18. The network device of claim 14, wherein the target BFR MAC CE comprises the third BFR MAC CE; and the processor is further configured to call and run the computer program to cause the network device to: receive the third BFR MAC CE in a case that the network device has not received a BFR MAC CE corresponding to a first TRP.

19. The network device of claim 14, wherein the target BFR MAC CE comprises the first BFR MAC CE; and the processor is further configured to call and run the computer program to cause the network device to:

receive the first BFR MAC CE in a case that the network device has not received a BFR MAC CE corresponding to a first TRP; or, receive the first BFR MAC CE directly.

20. The network device of claim 19, wherein the first BFR MAC CE comprises at least one of the following:

cell identification of the serving cell;

bandwidth part (BWP) identification;

TRP identifications of the at least two TRPs;

bits for indicating whether the beam failure occurs for the respective TRPs, different bits corresponding to different TRPs;

second indication information, the second indication information indicating whether a second available beam exists, and the second available beam being an available beam for one of the TRPs;

at least one second available beam;

third indication information, the third indication information indicating whether a cell beam failure occurs;

fourth indication information, the fourth indication information indicating whether a third available beam exists, the third available beam being an available beam for the serving cell; or at least one third available beam.

* * * * *